Jan. 19, 1937.   L. H. SCURLOCK   2,067,952
DIFFERENTIAL GEARING
Filed Nov. 6, 1935   2 Sheets-Sheet 1

INVENTOR.
Lewis H. Scurlock
BY
Arthur F. Durand
ATTORNEY.

Jan. 19, 1937.                L. H. SCURLOCK                2,067,952
                          DIFFERENTIAL GEARING
                          Filed Nov. 6, 1935            2 Sheets-Sheet 2
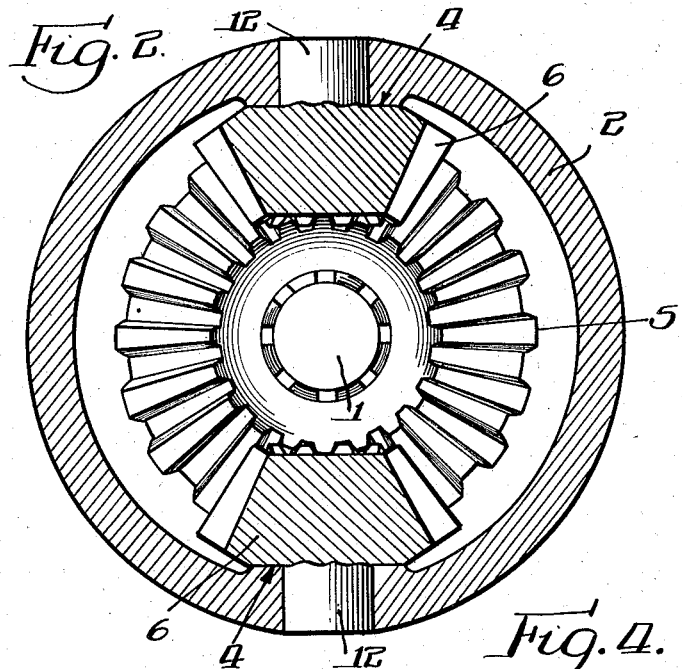
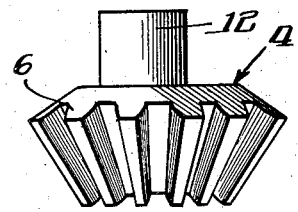
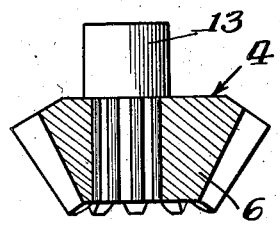
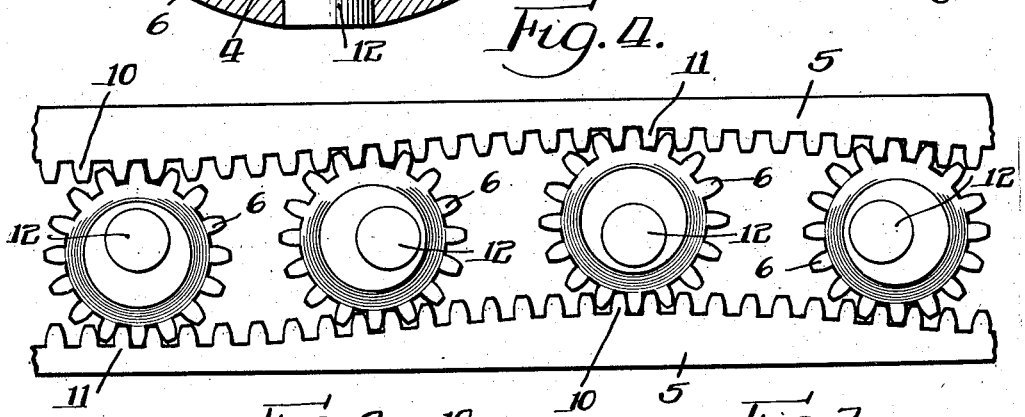
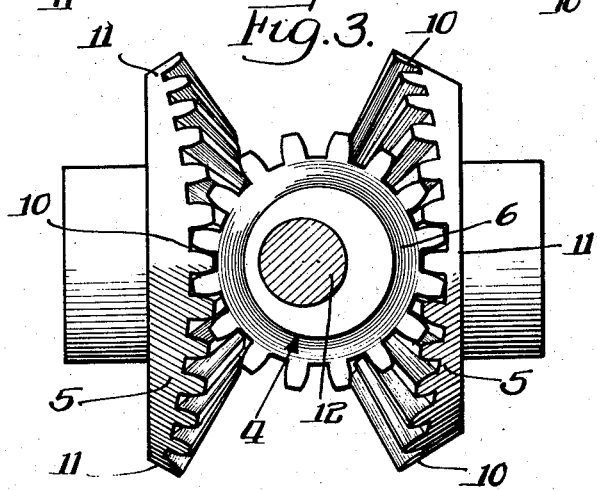
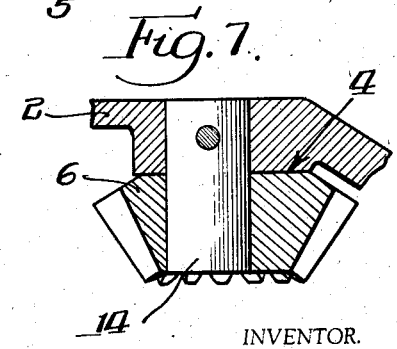
INVENTOR.
Lewis H. Scurlock
BY
Arthur F. Durand
ATTORNEY.

Patented Jan. 19, 1937

2,067,952

UNITED STATES PATENT OFFICE 2,067,952

DIFFERENTIAL GEARING

Lewis H. Scurlock, Chicago, Ill.

Application November 6, 1935, Serial No. 48,505

8 Claims. (Cl. 74—315)

This invention relates to differential gearing, and more particularly to those employed on motor vehicles, on the rear axle, to permit one rear wheel to travel faster than the other, as in turning a corner, or following a curve. It is well known, however, that while the ordinary differential gearing will operate in that manner, it is also true that if one wheel leaves the ground, or encounters a slippery place on the road, such wheel will spin or race, with a consequent loss of driving power.

Therefore, the object of the invention is to provide a novel and improved construction and arrangement whereby a gearing of this kind will insure a free differential action, as between the two driving wheels of the vehicle, and will at the same time prevent spinning or racing of either wheel, should one of the wheels leave the ground, or should it encounter a smooth or slippery place on the road, thereby to insure against interruption or reduction of the driving power to the other wheel that still has effective traction contact with the road.

It is also an object to provide certain details and features of construction and combinations tending to increase the general efficiency and the desirability of a differential gearing of this particular character.

To these and other useful ends, the invention consists in matters hereinafter set forth and claimed and shown in the accompanying drawings, in which—

Fig. 2 is a transverse section on line 2—2 in Fig. 1 of the drawings.

Fig. 3 is a side elevation of the sun gears, with one of the planet gears in place between them.

Fig. 4 is a diagrammatic view illustrating the mode of operation of said gearing.

Fig. 5 is a side elevation of one of the planets or pinions of said gearing.

Fig. 6 is a similar view, in section, showing a different form of the invention.

Fig. 7 is a view similar to Fig. 6, showing a different form of the invention.

Figure 1:
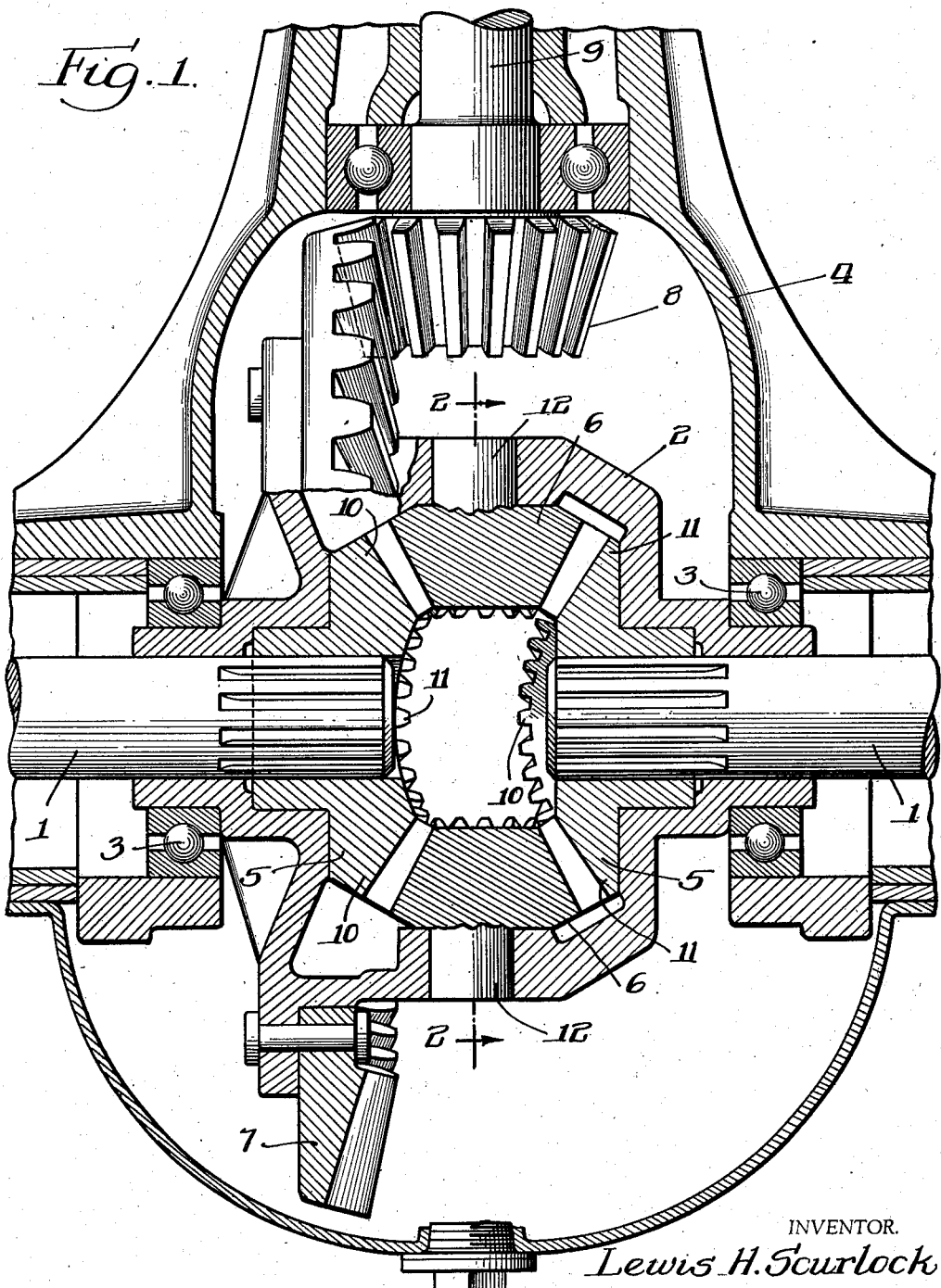
Fig. 1 is an axial section, and horizontal section, of a differential gearing embodying the principles of the invention.

As thus illustrated, the invention comprises the two sections of the rear axle 1 of a motor vehicle, supported in a rotary casing 2 that in turn is mounted for rotation on ball bearings 3 in the outer housing 4, as shown in Fig. 1 of the drawings. The sun gears 5 are mounted on the adjacent ends of the two sections of the axle, and the planets or pinions 6 are carried by the casing 2, which latter is rigid with the driving gear wheel 7 and which latter in turn is driven by the pinion 8 on the end of the usual propeller shaft 9 of the vehicle. Thus, a planetary gearing is provided, in general principle, to serve as a differential driving gear mechanism for the rear axle of the motor vehicle.

It will be seen, however, that the sun gears 5 are cut or formed differently from the ordinary gears, inasmuch as each gear has two high points 10, diametrically opposite, and two diametrically low points 11 on the toothed face thereof, whereby the toothed face of each gear is of hill and dale form, there being two diametrically opposite hills spaced apart by two diametrically opposite dales or valleys. It will also be seen that the pinions 6 have teeth formed as usual, but instead of being concentrically mounted, each pinion is excentrically mounted, as shown more clearly in Fig. 3 of the drawings, and as indicated by the excentrically located hubs 12 which support the pinions in round openings in the casing 2, previously described. The sun gears and planets or pinions are assembled as shown in the drawings, so that each pinion is between the high point 10 on one gear, and the low point 11 on the other gear. As shown, there are two pinions 6, but it is obvious that four pinions can be used, or some other number, if it is necessary or desirable. If four pinions are used, spaced equidistant, it will be seen that the two opposite pinions 6 will have the positions shown in Fig. 1 of the drawings, while the other two pinions will have an opposite position, so that while the long sides of the pinions 6 are in engagement with the gear 11, the long sides of the other two pinions will be in engagement with the gear 10, with the parts of the gearing in the positions shown in Fig. 1 of the drawings.

The hubs 12 can be integral with the pinions, as shown in Fig. 5 of the drawings; or in place of these integral hubs, cylindrical elements 13 can be forced into each pinion, as shown in Fig. 6 of the drawings, and keyed therein, or cylindrical elements 14 may be fixed in the casing 2, as shown in Fig. 7 of the drawings, and the pinions can rotate on the fixed spindles thus provided. In any event, each pinion rotates about an excentrically located axis, instead of about its true axis, when one driving wheel of the vehicle rotates faster than the other. And, with the pinions or planets thus carried by the casing 2, the ordinary pinion spider, usually mounted on the adjacent end portions of the two sections of the shaft, is not needed, and a stronger gearing construction is thereby provided.

Fig. 4 is a diagram which assumes that the toothed face of each gear 5 has been straightened out to form a straight rack, with the hills of one rack opposite the dales or valleys of the other rack, and shows the relative positions of the planets or pinions 5 between the two toothed racks, thus graphically illustrating the principle and mode of operation of the gearing shown and described. It will be seen that at times the axis of rotation of each pinion is equidistant between the two racks or toothed surfaces, whereas at other times such axis is nearer one rack than the other, because of the fact that the pinions are excentrically mounted in the manner shown and described.

Therefore, as stated, the invention is designed to prevent the spinning or racing of a wheel on a slippery place, or when one wheel leaves the ground, by equalizing the communication of power to both wheels, when the car is moving in a direct or straight line ahead. In addition, it is designed to equalize the braking action of the rear wheels of the car, for should the brakes not be effective on one of the rear wheels, the invention tends to equalize the braking action of the wheel with a defective brake. Not only does the invention tend to prevent wheel skidding and side sway, but it also tends to make the car ride easier, with less danger of accident, by delivering the smooth flow of power to both wheels, if the traction is equal, as well as when one wheel is off the ground or resting on a slippery place. In turning a corner, the invention tends to distribute the power to both wheels in proportion to the distance they must travel and the resistance offered to either wheel. These advantages are brought about by the use of the hill and dale sun gears, in combination with the excentrically mounted planets or pinions, and because it prevents the spinning or racing of either traction wheel, it follows that the gearing should have a longer life than the ordinary differential gearing.

It will be seen that the axes of the pinions 6 are always at right angles to the axis of the axle 1, and are always in a fixed common plane between the two gears 10 and 11, so that these individual axes of rotation for the pinions or planets are always in said plane. However, as is obvious, the pinions 6 swing from one side to the other, when they are rotating about their individual radial axes, and thus follow a zigzag path, when one section of the axle is rotating faster than the other. The axes of rotation of these pinions follow a straight circular path, in said plane, but the exact center of each pinion travels a zigzag path that alternately cuts through said plane, first from one side and then the other, when one section of the axle is turning faster than the other. When the two sections of the axle are rotating in unison, as when the motor vehicle is traveling straight ahead, the pinions 6, of course, do not rotate about their axes, while revolving about the axis of the axle. As the pinions 6 are held a fixed distance apart, on the faces of the gears 10 and 11, it follows that each pinion is always in mesh with each gear, even when one section of the axle 1 is rotating faster than the other, and the formation prevents racing when either traction wheel is raised from the ground, or is on a slippery spot on the pavement.

The word or term "zigzag" is, therefore, used generically to define any form of uniformly back and forth path of travel alternating from one side to the other of a straight line, while the pinions are rotating about their individual axes. In the form of the invention shown and described, the path of travel is a uniformly sinuous one, as indicated in the diagram, Fig. 4, composed of reverse curves forming a path composed of compound curves, so that in effect and for convenience of description the path of travel of the true centers of these pinions, when they are rotating about their individual axes, may be said to be a zigzag path of travel along which the pinions while rotating about their offset or excentric axes travel or revolve about the axis of the motor car driving axle.

What I claim as my invention is:

1. In a differential gearing, of the planetary type, a pair of bevel tooth sun gears, each keyed to a section of the driving axle of a motor vehicle, each gear having a hill and dale formation on the toothed face thereof, and excentrically mounted bevel tooth pinions or planets having teeth engaging the teeth of said gears, with the off-center axes of rotation of said pinions all in a fixed common plane between said gears, together with means for communicating driving power through said pinions to said gears, by revolving said pinions about the common axis of said gears, in said plane, causing said excentric planets to swing from side to side and follow a uniformly zigzag path between the hill and dale faces of said gears, when one section of the axle is rotating faster than the other.

2. A structure as specified in claim 1, the hills on each gear being located diametrically opposite to each other, the dales or valleys being similarly located on the toothed face of the gear, the hills of one gear being opposite the dales or valleys of the other gear, at times, and each pinion being always in engagement with both gears.

3. A structure as specified in claim 1, said means for communicating power through the planets to the gears comprising a gear casing on the inner side of which said pinions are excentrically mounted.

4. A structure as specified in claim 1, each pinion having its outer side provided with an integral and excentric hub.

5. A structure as specified in claim 1, each pinion having its outer side provided with an excentric hub fixed in the pinion.

6. A structure as specified in claim 1, each pinion having an excentric bore therein, and said means for communicating power through the pinions to the gears comprising a rotary member having radial studs fixed therein on the inner periphery thereof, said studs extending into the bores of the pinions.

7. A structure as specified in claim 1, the diameter of each pinion being substantially the same as the distance between the top of the hill on one gear and the bottom of the dale on the other gear, the hill and dale formation of each gear being a counterpart of the other.

8. A structure as specified in claim 1, including a rotary hollow member upon the inner periphery of which said excentric pinions are mounted for rotation about said axes.

LEWIS H. SCURLOCK.